United States Patent
Tobita et al.

(10) Patent No.: US 6,500,887 B1
(45) Date of Patent: Dec. 31, 2002

(54) POLYMERIC MATERIAL COMPOSITION

(75) Inventors: Etsuo Tobita, Urawa (JP); Yoko Nanbu, Urawa (JP); Shinichi Ishikawa, Urawa (JP); Takashi Ayabe, Urawa (JP)

(73) Assignee: Asahi Denka Kogyo K.K. (JP)

( * ) Notice: Subject to any disclaimer, the term of this patent is extended or adjusted under 35 U.S.C. 154(b) by 0 days.

(21) Appl. No.: 09/719,421

(22) PCT Filed: Apr. 12, 1999

(86) PCT No.: PCT/JP99/01940

§ 371 (c)(1),
(2), (4) Date: Feb. 22, 2001

(87) PCT Pub. No.: WO00/61685

PCT Pub. Date: Oct. 19, 2000

(51) Int. Cl.$^7$ ............................................... C08K 5/3492
(52) U.S. Cl. ..................................................... 524/100
(58) Field of Search ......................................... 524/100

(56) References Cited

U.S. PATENT DOCUMENTS

| | | | | |
|---|---|---|---|---|
| 5,637,706 A | * | 6/1997 | Stevenson et al. | 544/216 |
| 5,736,597 A | | 4/1998 | Birbaum et al. | 524/100 |

FOREIGN PATENT DOCUMENTS

| | | | |
|---|---|---|---|
| DE | 195 36 730 | 4/1996 | C07D/251/24 |
| EP | 0453 396 | 10/1991 | C09D/7/12 |
| JP | 42-25303 | 12/1942 | |
| JP | 4-117410 | 4/1992 | |
| JP | 08 267915 | 10/1996 | B41M/5/26 |
| JP | 11-71355 | 3/1999 | |

\* cited by examiner

Primary Examiner—Kriellion A. Sanders
(74) Attorney, Agent, or Firm—Nixon & Vanderhye PC

(57) ABSTRACT

A polymeric material composition with improved weatherability and resistance to discoloration, comprising 100 parts by weight of a polymer material and 0.001–10 parts by weight of a triazine compound represented by the following formula (I):

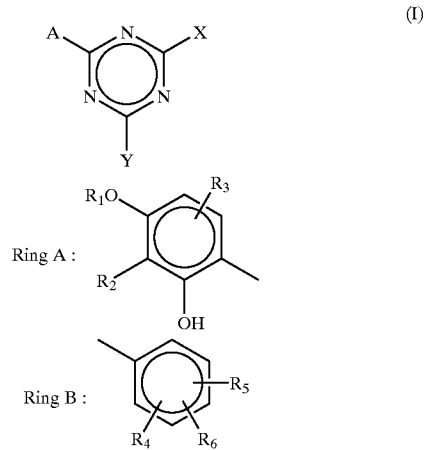

(wherein A represents ring A; X and Y each independently represents ring A or ring B; $R_1$ represents a C1–C25 alkyl group substituted by a (meth)acryloyloxy group, wherein the alkyl group may further be substituted by a hydroxyl group, a C1–C8 alkoxy group, or a C1–C8 acyloxy group, or the alkyl group my contain, as an insertion, an oxygen atom, a sulfur atom, a carbonyl group, an ester group, an amido group, or an imino group; $R_2$ represents a hydrogen atom; $R_3$, $R_4$, $R_5$ and $R_6$ each independently represents a hydrogen atom, a halogen atom, a hydroxyl group, a C1–C12 alkyl group, a C1–C12 alkenyl group, a C1–C12 alkoxy group, a C1–C12 alkoxycarbonyl group, or an arylalkyl group, wherein the alkyl group, the alkoxy group, the alkoxycarbonyl group, and the arylalkyl group may be substituted by a hydroxyl group, a halogen atom, a C1–C12 alkyl group, a C1–C12 alkoxy group, a sulfonic acid group, a glycidyloxy group, a cyano group, an isocyanate group, or a (meth)acryloyl group, or, the alkyl group, the alkoxy group, the alkoxycarbonyl group, and the arylalkyl group may contain, as an insertion, an oxygen atom, a sulfur atom, a carbonyl group, an ester group, an amido group, or an imino group; and the substitution and the insertion may occur in combination, and $R_3$ represents a hydrogen atom in the case of $R_3$ being in the 5-position.)

5 Claims, No Drawings

POLYMERIC MATERIAL COMPOSITION

TECHNICAL FIELD

The present invention relates to a polymeric material composition having improved properties in terms of weatherability and resistance to discoloration by virtue of a specific triaryltriazine compound incorporated in the composition. The triaryltriazine compound has at least one aryl group which is a 2-hydroxyphenyl group having, at the 4-position thereof, an alkyl group substituted by a (meth) acryloyloxy group.

BACKGROUND OF THE INVENTION

Polymer materials such as polyethylene, polypropylene, styrene resin, polyvinyl chloride, polycarbonate, and polyester; organic pigments; and organic dyes may not endure prolonged use, due to deterioration caused by light and resultant discoloration or lowering of mechanical strength.

Conventionally, in order to prevent deterioration of such organic materials and to control the wavelength of light penetrating the materials, a variety of UV-absorbers have been used. Examples of such UV-absorbers include benzophenone, benzotriazole, 2,4,6-triaryltriazine, and cyanoacrylate compounds.

These UV-absorbers exhibit various UV absorption spectra attributed to the structures thereof. Also, the compatibility and volatility of the UV-absorbers differ depending on the material. Therefore, an appropriate UV-absorber is chosen in accordance with the intended use of the polymer material. Particularly, a thin film-like material employed as a protective layer must contain a large amount of UV-absorber in order to enhance the UV-shielding effect of the layer. Therefore, there is demand for an UV-absorber having excellent compatibility with a substrate layer, low volatility, and high absorption coefficient.

A 2,4,6-triaryltriazine UV-absorber exhibits a high absorption coefficient and excellent heat resistance. However, when the UV-absorber is incorporated into a polymer material, the UV-absorber may impart color to a resin of the material during processing, which is detrimental to practical use.

Japanese Patent Publication (kokoku) No. 42-25303 and Japanese Patent Application Laid-Open (kokai) No. 4-117410 disclose that, when a (meth)acryloyl-group-containing UV-absorber is incorporated into a skeleton of a polymer material through polymerization, or when the UV-absorber is oligomerized to thereby form a high-molecular-weight UV-absorber, the UV-absorber thus obtained exhibits persistent UV-absorbing effect in the polymer material. During the polymerization or oligomerization, the UV-absorber is copolymerized with a compound having an ethylenic unsaturated bond, and thus (meth)acryloyl groups present in the polymer material are lost. For this reason, it has never been expected that discoloration of polymer materials could be prevented if an UV-absorber is added into a polymer material without loss of (meth)acryloyl groups.

DISCLOSURE OF THE INVENTION

In view of the foregoing, the present inventors have performed extensive studies, and have found that a triazine compound represented by the following formula (I) having a substituent at a specific position thereof and having a (meth)acryloyl group exhibits UV-absorbing effects; and that a polymeric material composition containing the triazine compound exhibits excellent weatherability and excellent heat resistance without inducing discoloration of the organic material. The present invention has been accomplished on the basis of these findings.

Accordingly, the present invention provides a polymeric material composition comprising 100 parts by weight of a polymer material and 0.001–10 parts by weight of a triazine compound represented by the following formula (I):

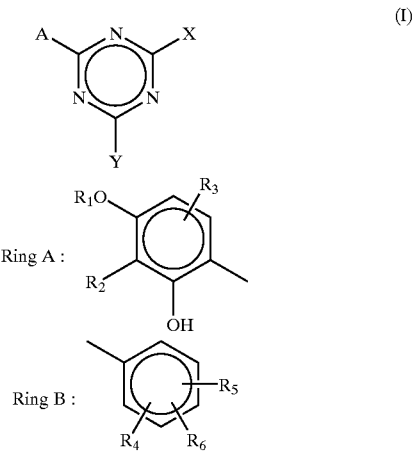

(wherein A represents ring A; X and Y each independently represents ring A or ring B; $R_1$ represents a C1–C25 alkyl group substituted by a (meth)acryloyloxy group, wherein the alkyl group may further be substituted by a hydroxyl group, a C1–C8 alkoxy group, or a C1–C8 acyloxy group, or the alkyl group may contain, as an insertion, an oxygen atom, a sulfur atom, a carbonyl group, an ester group, an amido group, or an imino group; $R_2$ represents a hydrogen atom; $R_3$, $R_4$, $R_5$ and $R_6$ each independently represents a hydrogen atom, a halogen atom, a hydroxyl group, a C1–C12 alkyl group, a C1–C12 alkenyl group, a C1–C12 alkoxy group, a C1–C12 alkoxycarbonyl group, or an arylalkyl group, wherein the alkyl group, the alkoxy group, the alkoxycarbonyl group, and the arylalkyl group may be substituted by a hydroxyl group, a halogen atom, a C1–C12 alkyl group, a C1–C12 alkoxy group, a sulfonic acid group, a glycidyloxy group, a cyano group, an isocyanate group, or a (meth) acryloyl group, or, the alkyl group, the alkoxy group, the alkoxycarbonyl group, and the arylalkyl group may contain, as an insertion, an oxygen atom, a sulfur atom, a carbonyl group, an ester group, an amido group, or an imino group; and the substitution and the insertion may occur in combination, and $R_3$ represents a hydrogen atom in the case of $R_3$ being in the 5-position.) The present invention will next be described in more detail.

BEST MODES FOR CARRYING OUT THE INVENTION

Triazine Compounds

Examples of the alkyl group which is to be substituted by a (meth)acryloyloxy group to form a (meth)acryloyloxy group-substituted alkyl group $R_1$ include methyl, ethyl, propyl, isopropyl, butyl, isobutyl, sec-butyl, tert-butyl, pentyl, sec-pentyl, tert-pentyl, hexyl, isohexyl, heptyl, octyl, isooctyl, sec-octyl, tert-octyl, and 2-ethylhexyl. Examples of the alkyl group having a substituent include 2-acetoxypropyl, 2-hydroxypropyl, and 2-butoxymethylethyl. Examples of constituent chains of the alkyl group, in which an oxygen atom or another atom is inserted, include polyoxyethylene and polyoxypropylene.

More specifically, examples of the group represented by $R_1$ include (meth)acryloyloxyalkyl groups such as acryloyloxyethyl, methacryloyloxyethyl, 2-hydroxy-3-methacryloyloxypropyl, 2-(2-methacryloyloxyethyloxy)ethyl, and 2-hydroxy-3-(2-methacryloyloxyethyloxy)propyl.

Examples of the alkyl groups represented by $R_3$, $R_4$, $R_5$, or $R_6$ in formula (I) include methyl, ethyl, propyl, isopropyl, butyl, sec-butyl, tert-butyl, isobutyl, amyl, tert-amyl, octyl, tert-octyl, decyl, undecyl, and dodecyl. Examples of the arylalkyl group include 1-methyl-1-phenylethyl, benzyl, and 2-phenylethyl.

Examples of the C1–C12 alkenyl groups represented by $R_3$, $R_4$, $R_5$, or $R_6$ include linear or branched propenyl, butenyl, pentenyl, hexenyl, heptenyl, and octenyl. In such an alkenyl group, an unsaturated bond may be present at any position.

Examples of the C1–C12 alkoxy groups and the C1–C12 alkoxycarbonyl groups represented by $R_3$, $R_4$, $R_5$, or $R_6$ include derivatives of alkyl groups such as methyl, ethyl, propyl, isopropyl, butyl, sec-butyl, tert-butyl, isobutyl, amyl, tert-amyl, octyl, tert-octyl, decyl, undecyl, and dodecyl. Examples of the arylalkyl group include a cumyl group and a phenylmethylene group. Examples of the halogen atom include a fluorine atom, a chlorine atom, and a bromine atom.

Examples of the triazine compounds represented by formula (I), which are used in the present invention, include the following No. 1 to No. 6 compounds.

Compound No. 1

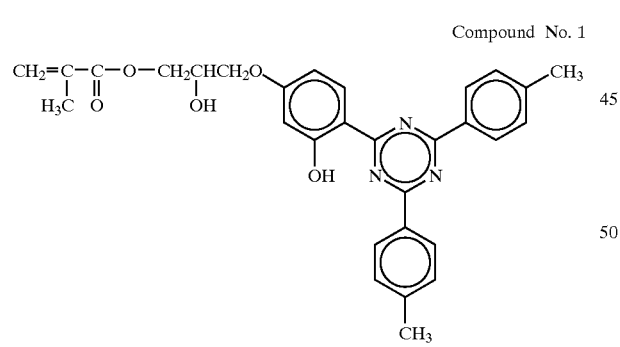

Compound No. 2

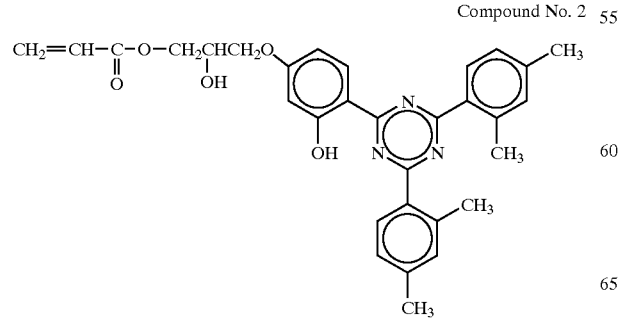

Compound No. 3

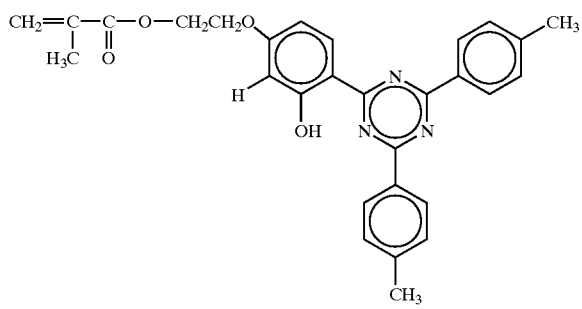

Compound No. 4

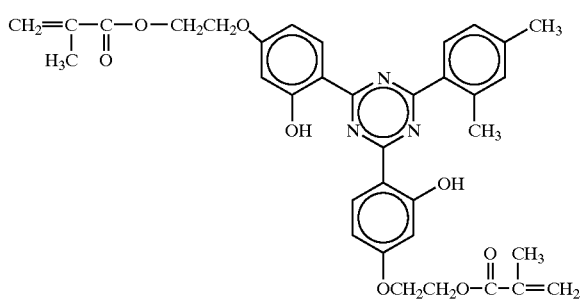

Compound No. 5

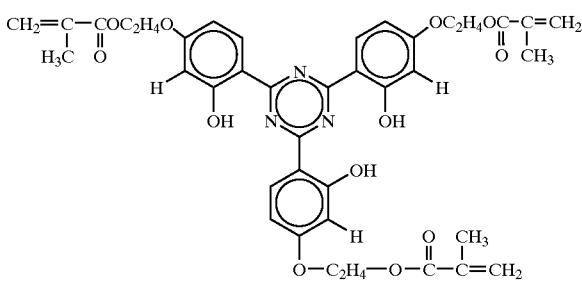

Compound No. 6

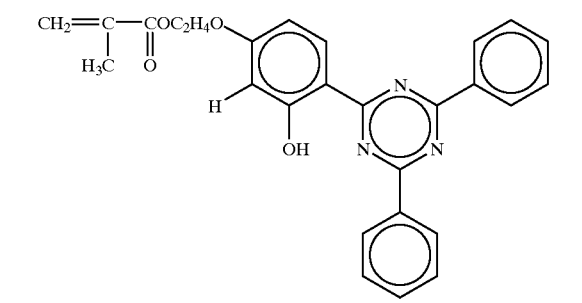

The method for synthesizing the triazine compounds of formula (I), which are used in the present invention, is not particularly limited, and the compounds may be synthesized by means of any customary method.

For example, any of the compounds may be synthesized by means of the following synthesis method: a method in which 2-(2,4-dihydroxyphenyl)-4,6-diaryl-s-triazine is reacted with glycidyl methacrylate, to thereby yield 2-(2-hydroxy-4-(2-hydroxy-3-methacryloyloxypropyloxy)phenyl)-4, 6-diaryl-s-triazine; a method in which 2-(2,4-dihydroxyphenyl)-4,6-diaryl-s-triazine is reacted with alkylene oxide to yield 2-(2-hydroxy-4-(2-hydroxyalkoxy)phenyl)-4,6-diaryl-s-triazine, followed by reaction with (meth)acrylic acid, to thereby yield 2-(2-hydroxy-4-(2-(meth)acryloyloxyalkoxy)phenyl)-4,6-aryl-s-triazine; or a method in which benzamidine hydrochloride is reacted with phenyl resorcylate to yield 2-(2,4-dihydroxyphenyl)-4,6-diphenyl-s-triazine, followed by reaction with alkylene oxide and then with (meth)acrylic acid, to thereby yield 2-(2-hydroxy-4-(2-(meth)acryloyloxyalkoxy)phenyl)-4,6-diphenyl-s-triazine.

Polymer Material

Examples of the polymer material used in the present invention include thermoplastic resins, thermosetting resins, and elastomers.

Examples of thermoplastic resins include α-olefin polymers such as high-density, low-density, or linear low-density polyethylene, polypropylene, polybutene-1, and poly-3-methylpentene; polyolefins and copolymers thereof such as ethylene/vinyl acetate copolymers and ethylene/propylene copolymers; halogen-containing resins such as polyvinyl chloride, polyvinylidene chloride, chlorinated polyethylene, chlorinated polypropylene, polyvinylidene fluoride, rubber chloride, vinyl chloride/vinyl acetate copolymers, vinyl chloride/ethylene copolymers, vinyl chloride/vinylidene chloride copolymers, vinyl chloride/vinylidene chloride/vinyl acetate terpolymers, vinyl chloride/acrylate copolymers, vinyl chloride/maleate copolymers, and vinyl chloride/cyclohexylmaleimide copolymers; petroleum resins; coumarone resins; polystyrene; polyvinyl acetate; acrylic resins; copolymers of styrene and/or α-methylstyrene and other monomers (such as maleic anhydride, phenylmaleimide, methyl methacrylate, butadiene, and acrylonitrile), such as AS resins, ABS resins, MBS resins, and heat-resistant ABS resins; polymethyl methacrylate; polyvinyl alcohol; polyvinyl formal; polyvinyl butyral; linear polyesters such as polyethylene terephthalate and polytetramethylene terephthalate; polyphenylene oxide; polyamides such as polycaprolactam and polyhexamethylene adipamide; polycarbonate; branched polycarbonate; polyacetal; polyphenylene sulfide; polyurethane; cellulose resins; and blends thereof.

Examples of thermosetting resins include phenolic resins, urea resins, melamine resins, epoxy resins, and unsaturated polyester resins.

Examples of elastomers include isoprene rubber, butadiene rubber, acrylonitrile/butadiene copolymer rubber, and styrene/butadiene copolymer rubber.

Of the above-described polymer materials, hetero-atom-containing polymer materials are particularly preferred because such polymer materials are highly compatible with triazine compounds of formula (I). Examples of the hetero-atom-containing polymer materials include polycarbonate; branched polycarbonate; linear polyesters such as polyethylene terephthalate and polytetramethylene terephthalate; polyamides such as polycaprolactam and polyhexamethylene adipamide; polyphenylene oxide; polyphenylene sulfide; poly(meth)acrylates such as polymethyl (meth)acrylate and polybutyl (meth)acrylate. Of these polymer materials, polymer materials containing a hetero-atom or an aromatic group in the main chain thereof are particularly preferred. Examples of such polymer materials include polycarbonate, polyethylene terephthalate, and polyphenylene oxide.

These polymer materials may be used singly or in combination of two or more species. For example, these polymer materials may be used as composite materials such as polycarbonate/ABS and polycarbonate/polyester; or may be used as laminate films. Such a laminate film comprises a first polycarbonate film and a second polycarbonate film or poly(meth)acrylate film containing the specific triazine compound of formula (I) used in the present invention.

Polymeric Material Composition

The polymeric material composition of the present invention comprises a polymer material and a triazine compound represented by formula (I). In the composition, the amount of the triazine compound is 0.001–10 parts by weight on the basis of 100 parts by weight of the polymer material, preferably 0.005–10 parts by weight. When the amount of the triazine compound falls within the above range, weatherability and resistance to discoloration of the polymeric material composition are improved.

The method for application of the triazine compound of the present invention to the polymer material is not particularly limited. When the triazine compound is added to the polymer material, the compound may assume the form of powder, aqueous dispersion such as emulsion and suspension, or solution of organic solvent. However, when the triazine compound is added to the polymer material during polymerization, or when the compound is added to the material under the conditions such that reaction of a (meth)acryloyl group occurs at a processing temperature, the resultant polymeric material composition considerably colors during processing, which is detrimental to practical use.

The polymeric material composition of the present invention may be used in combination with additives that are used for general purposes, such as antioxidants and stabilizers, if necessary.

Examples of particularly preferred additives include antioxidants such as phenolic antioxidants, sulfur-containing antioxidants, and phosphite antioxidants; and hindered amine light stabilizers. Of these, hindered amine light stabilizers such as 2,2,6,6-tetramethylpiperidine compounds are more preferable because such a light stabilizer and the triazine compound of the present invention exhibit synergistic effects.

Examples of phenolic antioxidants include 2,6-di-tert-butyl-p-cresol, 2,6-diphenyl-4-octadecyloxyphenol, stearyl (3,5-di-tert-butyl-4-hydroxyphenyl) propionate, distearyl (3,5-di-tert-butyl-4-hydroxybenzyl) phosphonate, thiodiethyleneglycol bis[(3,5-di-tert-butyl-4-hydroxyphenyl) propionate], 1,6-hexamethylene bis [3,5-di-tert-butyl-4-hydroxyphenyl)propionate], 1,6-hexamethylene bis[(3,5-di-tert-butyl-4-hydroxyphenyl)propionate amide], 4,4'-thiobis (6-tert-butyl-m-cresol), 2,2'-methylenebis(4-methyl-6-tert-butylphenol), 2,2'-methylenebis(4-ethyl-6-tert-butylphenol), bis[3,3-bis(4-hydroxy-3-tert-butylphenyl) butyric acid]glycol ester, 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl) phenyl]terephthalate, 1,3,5-tris(2,6-dimethyl-3-hydroxy-4-tert-butylbenzyl) isocyanurate, 1,3,5-tris(3,5-di-tert-butyl-4-hydroxybenzyl) isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl] isocyanurate, tetrakis[methylene-3-(3,5-di-tert-butyl-4-hydroxyphenyl) propionate]methane, 2-tert-butyl-4-methyl-6-(2-acryloyloxy-3-tert-butyl-5-methylbenzyl)phenol, 3,9-bis[1,1-dimethyl-2-{(3-tert-butyl-4-hydroxy-5-methylphenyl)propionyloxy}ethyl]-2,4,8,10-tetraoxaspiro [5.5]undecane, and triethyleneglycol bis[(3-tert-butyl-4-hydroxy-5-methylphenyl)propionate].

Examples of sulfur-containing antioxidants include dialkyl thiodipropionates such as dilauryl thiodipropionate, dimyristyl thiodipropionate, and distearyl thiodipropionate; and β-alkylmercaptopropionate esters of polyols such as pentaerythritol tetra(β-dodecylmercaptopropionate).

Examples of the phosphite antioxidant include tris-nonylphenyl phosphite, tris(2,4-di-tert-butylphenyl) phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(stearyl)pentaerythritol diphosphite, di(nonylphenyl) pentaerythritol diphosphite, bis(2,4-di-tert-butylphenyl) pentaerythritol diphosphite, bis(2,6-di-tert-butyl-4-methylphenyl)pentaerythritol diphosphite, bis(2,4,6-tri-tert-butylphenyl)pentaerythritol diphosphite, tetra(tridecyl) bisphenol A diphosphite, tetra(tridecyl) isopropylidenediphenol diphosphite, tetra(tridecyl)-4,4'-n-butylidenebis(2-tert-butyl-5-methylphenol) diphosphite, hexa(tridecyl)-1,1,3-tris(2-methyl-4-hydroxy-5-tert-butylphenyl)butane triphosphite, 2,2'-methylenebis(4,6-di-tert-butylphenyl)-2-ethylhexyl phosphite, 2,2'-methylenebis (4,6-di-tert-butylphenyl)octadecyl phosphite, 2,2'-ethylidenebis(4,6-di-tert-butylphenyl) fluorophosphite, tetrakis(2,4-di-tert-butylphenyl)biphenylene diphosphonite, 9,10-dihydro-9-oxa-10-phosphorphenanthrene-10-oxide, tris(2-[(2,4,8,10-tetrakis-tert-butyldibenzo[d,f][1,3,2] dioxaphosphepin-6-yl)oxy]ethyl)amine, and a phosphite of 2-ethyl-2-butylpropyleneglycol and 2,4,6-tri-tert-butylphenol.

Examples of hindered amine light stabilizers include 2,2,6,6-tetramethyl-4-piperidyl benzoate, N-(2,2,6,6-tetramethyl-4-piperidyl)dodecylsuccinimide, 1-[(3,5-di-tert-butyl-4-hydroxyphenyl)propionyloxyethyl]-2,2,6,6-tetramethyl-4-piperidyl-(3,5-di-tert-butyl-4-hydroxyphenyl) propionate, bis(2,2,6,6-tetramethyl-4-piperidyl) cebacate, bis(1,2,2,6,6-pentamethyl-4-piperidyl) cebacate, bis(1,2,2,6,6-pentamethyl-4-piperidyl)-2-butyl-2-(3,5-di-tert-butyl-4-hydroxybenzyl) malonate, N,N'-bis(2,2,6,6-tetramethyl-4-piperidyl)hexamethylenediamine, tetra(2,2,6,6-tetramethyl-4-piperidyl)butane tetracarboxylate, tetra(1,2,2,6,6-pentamethyl-4-piperidyl)butane tetracarboxylate, bis(2,2,6,6-tetramethyl-4-piperidyl) di(tridecyl)butane tetracarboxylate, bis(1,2,2,6,6-pentamethyl-4-piperidyl) di(tridecyl)butane tetracarboxylate, 3,9-bis[1,1-dimethyl-2-{tris(2,2,6,6-tetramethyl-4-piperidyloxycarbonyloxy)-butylcarbonyloxy}ethyl]-2,4,8,10-tetraoxaspiro[5.5] undecane, 3,9-bis[1,1-dimethyl-2-{tris(1,2,2,6,6-pentamethyl-4-piperidyloxycarbonyloxy) butylcarbonyloxy}ethyl]-2,4,8,10-tetraoxaspiro[5.5] undecane, 1,5,8,12-tetrakis[4,6-bis{N-(2,2,6,6-tetramethyl-4-piperidyl)butylamino}-1,3,5-triazin-2-yl]-1,5,8,12-tetraazadodecane, a condensation product of 1-(2-hydroxyethyl)-2,2,6, 6-tetramethyl-4-piperidinol/dimethyl succinate, a condensation product of 2-tert-octylamino-4,6-dichloro-s-triazine/N,N'-bis(2,2,6,6-tetramethyl-4-piperidyl)hexamethylenediamine, a condensation product of N,N'-bis(2,2,6,6-tetramethyl-4-piperidyl)-hexamethylenediamine/dibromoethane, 2,2,6,6-tetramethyl-4-piperidyl-1-oxime, bis(2,2,6,6-tetramethyl-4-piperidyl-1-oxime) cebacate, and 2,2,6,6-tetramethyl-4-piperidyl-N-oxime benzoate.

Other additives may be incorporated in the polymeric material composition of the present invention, if necessary. Examples of the additives include heavy metal deactivating compounds, nucleating agents, metallic soap, organotin compounds, plasticizers, epoxy compounds, foaming agents, antistatic agents, fire retardants, lubricants, and processing aids.

Applications of the polymeric material compositions are not particularly limited. However, the compositions are particularly suitable for forming a thin-film-like material.

Examples of the thin-film-like material include synthetic resin films, sheets, paints, and fibers that are used for nonwoven or woven fabrics.

EXAMPLES

The present invention will next be described in more detail by way of examples, which should not be construed as limiting the invention thereto. Unless otherwise specified, the symbol "%" refers to "wt. %."

Synthesis Example: Synthesis of Compound No. 6

Benzamidine hydrochloride (47 g, 0.3 mol) and phenyl resorcylate (33 g, 0.14 mol) were dissolved in ethanol (195 g). To the resultant solution, a 28% sodium methylate solution (58 g, sodium methylate: 0.3 mol) was added and the reaction mixture was heated to 78° C. while being stirred, to thereby remove methanol. After completion of methanol removal, the resultant reaction mixture was stirred for 20 hours at 78° C., followed by cooling to 5° C. The resultant mixture was filtered to thereby isolate a solid product, and the thus-obtained solid product was washed with methanol and water, yielding pale yellow crystals (18.4 g, 37.7% yield)

To the thus-obtained 2-(2,4-dihydroxyphenyl)-4,6-diphenyl-s-triazine (17.0 g, 0.05 mol) were added 2-bromoethanol (94.8 g, 0.75 mol) and dimethylformamide, and then a 48% NaOH aqueous solution (29.2 g, NaOH: 0.35 mol) was added dropwise to the mixture at 85° C. The resultant mixture was allowed to react for 10 hours at 85° C. and then cooled, followed by neutralization with concentrated hydrochloric acid. The resultant precipitate was collected through filtration, followed by washing with water and drying, yielding 2-hydroxy-4-(2-hydroxyethyloxy) phenyl-4,6-diphenyl-s-triazine (hereinafter referred to as "HETr") (15.4 g, 80% yield). To the thus-obtained HETr (15 g, 0.039 mol) were added methacrylic acid (10 g, 0.116 mol), xylene, and p-toluenesulfonic acid (0.6 g), and then the mixture was refluxed at 140° C. for 10 hours. The resultant mixture was washed with water, followed by recrystallization from a solvent mixture of xylene/methanol (1/1), yielding a white solid product having a melting point of 195° C. (15.0 g, 85% yield).

Chemical shifts (number of $^1$H, assignment) of the thus-obtained compound measured by $^1$H-NMR spectroscopy are as follows: 1.8–2.1 (3H, —CH$_3$), 4.2–4.7 (4H, —OCH$_2$CH$_2$O—), 5.5–6.2 (2H, C=CH$_2$), 6.5–6.8 (2H, Ar—H (adjacent to Ar—O)), 7.4–7.8 (6H, Ar—H (adjacent to Ar—H)), 8.4–8.8 (5H, Ar—H (adjacent to Ar—T: T represents a triazine ring)).

Absorption peaks of the thus-obtained compound determined by IR spectroscopy are as follows: 3300–3500 cm$^{-1}$, 1710 cm$^{-1}$, 1630 cm$^{-1}$, 1590 cm$^{-1}$, 1530 cm$^{-1}$, 1510 cm$^{-1}$, 1440 cm$^{-1}$, 1410 cm$^{-1}$, 1360 cm$^{-1}$, 1320 cm$^{-1}$, 1280 cm$^{-1}$, 1160 cm$^{-1}$.

Example 1

Bisphenol A polycarbonate (100 parts by weight) having a limiting viscosity number of 0.57 (as measured in dioxane at 30° C.) and each of the UV-absorbing compounds (10 parts by weight) listed in Table 1 and serving as test compounds were mixed together. A protective layer (thickness: 40 μm) containing the resultant mixture and a substrate layer formed from polycarbonate not containing the UV-absorbing compound were laminated through co-extrusion at 280° C.×80 rpm, to thereby obtain a sheet. A yellowness index was used to evaluate the discoloration of the sheet obtained through the above procedure. The sheet was also evaluated in terms of weatherability by comparing difference in color of the sheet before and after irradiation under a high-pressure mercury lamp for two weeks.

The amount of the test compound remaining in each of the polymeric material compositions subjected to the extrusion process was measured. Briefly, each of the sheets obtained in the above-described manner was dissolved in tetrahydrofuran, and then low molecular weight components contained in the solution were collected through liquid chromatography. UV absorption spectra of the collected material were measured. On the basis of the absorption intensity as measured at 350 nm, the percentage of the test compound remaining in the polymeric material composition with respect to the initial amount of the compound was determined. The results are shown in Table 1.

TABLE 1

| No. | Sample | Dis-coloration Yellowness | Weather-ability Difference in color | Remaining amount % |
|---|---|---|---|---|
| Comp. Ex. 1-1 | Comparative compound 1 | 17.5 | 11.3 | 0*1 |
| Comp. Ex. 1-2 | Comparative compound 2 | 14.3 | 12.6 | 71 |
| Comp. Ex. 1-3 | Comparative compound 3 | 15.6 | 10.4 | 89 |
| Example 1-1 | Compound No. 1 | 12.3 | 5.4 | 88 |
| Example 1-2 | Compound No. 2 | 12.2 | 5.6 | 91 |
| Example 1-3 | Compound No. 3 | 12.1 | 5.4 | 87 |
| Example 1-4 | Compound No. 4 | 12.5 | 5.5 | 90 |
| Example 1-5 | Compound No. 5 | 12.8 | 5.7 | 92 |
| Example 1-6 | Compound No. 6 | 12.2 | 5.2 | 91 |

*1: A polymer corresponding to the incorporated UV-absorber oligomer was detected (92%).

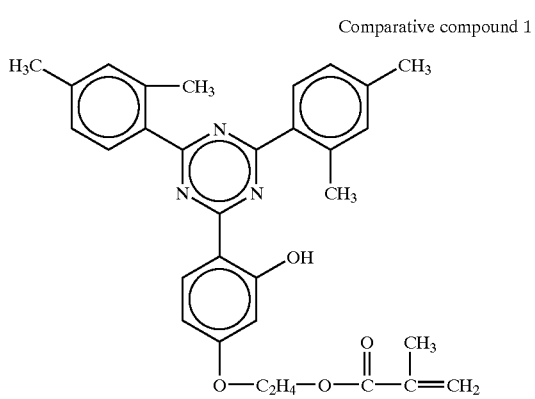

Comparative compound 1 /Methyl methacrylate = 1/2 (mol/mol) copolymer (Av. MW. = 5700)

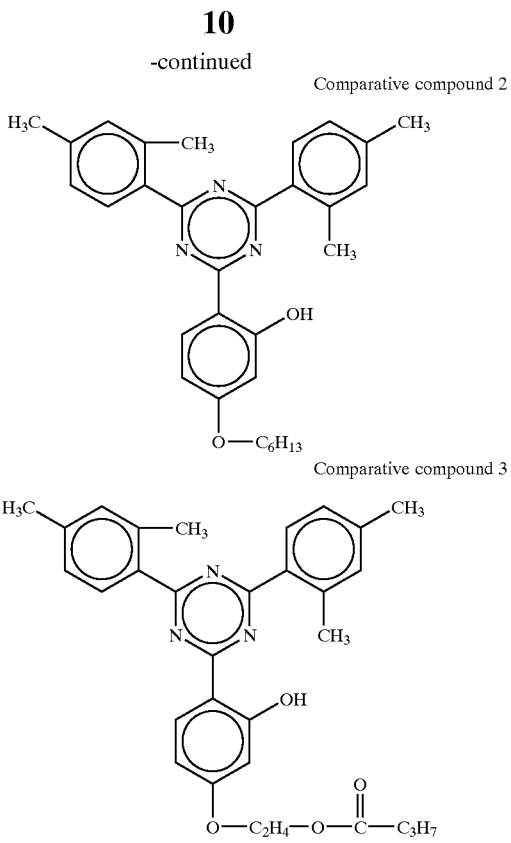

Comparative compound 2

Comparative compound 3

Example 2

Polymethyl methacrylate (100 parts by weight) and each of the UV-absorbing compounds (8 parts by weight) listed in Table 2 and serving as test compounds were mixed together. A protective layer (thickness: 50 μm) containing the resultant mixture and a sheet of Bisphenol A polycarbonate (limiting viscosity number as measured in dioxane at 31° C.: 0.57) (thickness: 10 mm) were laminated, to thereby obtain a sheet. The sheet was measured against a yellowness index. The sheet was also evaluated in terms of weatherability by comparing difference in color of the sheet before and after irradiation under a high-pressure mercury lamp for two weeks.

The amount of the test compound remaining in each of the polymeric material compositions subjected to the extrusion process was measured in a manner similar to that described in Example 1. The results are shown in Table 2.

TABLE 2

| No. | Sample | Dis-coloration Yellowness | Weather-ability Difference in color | Remaining amount % |
|---|---|---|---|---|
| Comp. Ex. 2-1 | Comparative compound 1 | 22.5 | 14.3 | 0*2 |
| Comp. Ex. 2-2 | Comparative compound 2 | 20.3 | 13.6 | 76 |
| Comp. Ex. 2-3 | Comparative compound 3 | 21.2 | 14.1 | 91 |
| Example 2-1 | Compound No. 1 | 16.3 | 8.9 | 90 |
| Example 2-2 | Compound No. 2 | 16.2 | 8.6 | 93 |

TABLE 2-continued

| No. | Sample | Discoloration Yellowness | Weatherability Difference in color | Remaining amount % |
|---|---|---|---|---|
| Example 2-3 | Compound No. 3 | 16.5 | 8.4 | 91 |

*²: A polymer corresponding to the incorporated UV-absorber oligomer was detected (94%).

Example 3

Each of the UV-absorbing compounds (0.3 parts by weight) listed in Table 3 and serving as test compounds was added to polyethylene terephthalate (100 parts by weight) so as to prepare a polymeric material composition. Each polymeric material composition was subjected to injection molding at 260° C., to thereby obtain a sheet having a thickness of 1 mm. Each of the sheets was measured against a yellowness index. Each of the sheets was also evaluated in terms of weatherability by comparing difference in color of the sheet before and after irradiation under a high-pressure mercury lamp for two weeks.

The amount of the test compound remaining in the polymeric material composition subjected to the injection molding process was measured in a manner similar to that described in Example 1. The results are shown in Table 3.

TABLE 3

| No. | Sample | Discoloration Yellowness | Weatherability Difference in color | Remaining amount % |
|---|---|---|---|---|
| Comp. Ex. 3-1 | Comparative compound 1 | 25.5 | 13.3 | 0*³ |
| Comp. Ex. 3-2 | Comparative compound 2 | 24.3 | 13.6 | 78 |
| Comp. Ex. 3-3 | Comparative compound 3 | 25.2 | 13.1 | 90 |
| Example 3-1 | Compound No. 1 | 18.2 | 7.8 | 93 |
| Example 3-2 | Compound No. 2 | 18.6 | 7.7 | 91 |
| Example 3-3 | Compound No. 3 | 18.3 | 8.0 | 92 |

*³: A polymer corresponding to the incorporated UV-absorber oligomer was detected (89%).

Comparisons were made between Comparative Example 1-2 and Comparative Example 1-3, between Comparative Example 2-2 and Comparative Example 2-3, and between Comparative Example 3-2 and Comparative Example 3-3. The comparisons reveal that the triaryltriazine compound having an ester linkage is excellent in its ability to remain in the polymeric material composition during such a processing stage as extrusion or injection molding.

Comparisons were made between Comparative Example 1-3 and Example 1-1, between Comparative Example 2-3 and Example 2-1, and between Comparative Example 3-3 and Example 3-1. The comparisons reveal that the triaryltriazine compound having a (meth)acryloyl group is excellent in its ability to remain in the polymeric material composition during such a processing stage as extrusion or injection molding. The comparisons also reveal that the compound is excellent in terms of resistance to discoloration and weatherability.

Comparisons were made between Comparative Example 1-1 and Example 1-1, between Comparative Example 2-1 and Example 2-1, and between Comparative Example 3-1 and Example 3-1. The comparisons reveal that, when an acryloyloxy group of the triaryltriazine compound having a (meth)acryloyloxy group is converted into a propionyloxy group through polymerization, the compound is excellent in its ability to remain in the polymeric material composition, but resistance to discoloration and weatherability of the compound are lowered. Briefly, when the compound has an acryloyloxy group in its structure, weatherability and resistance to discoloration of the compound are improved.

Industrial Applicability

As is apparent from the results of the Examples, when the triazine compound containing a (meth)acryloyl group, serving as a UV-absorber having a specific structure, is added into a polymer material without causing reaction of the (meth)acryloyl group, the resultant polymeric material composition barely discolors during processing and exhibits excellent weatherability, as compared with a composition containing a conventional triazine UV-absorber.

What is claimed is:

1. A polymeric material composition comprising 100 parts by weight of a polymer material and 0.001–10 parts by weight of a triazine compound represented by the following formula (I):

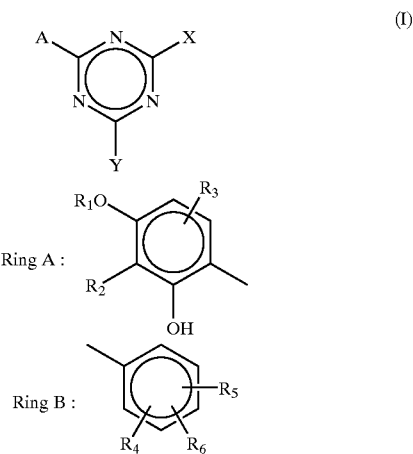

wherein A represents ring A; X and Y each independently represents ring A or ring B; $R_1$ represents a C1–C25 alkyl group substituted by a (meth)acryloyloxy group, wherein the alkyl group may further be substituted by a hydroxyl group, a C1–C8 alkoxy group, or a C1–C8 acyloxy group, or the alkyl group my contain, as an insertion, an oxygen atom, a sulfur atom, a carbonyl group, an ester group, an amido group, or an imino group; $R_2$ represents a hydrogen atom; $R_3$, $R_4$, $R_5$ and $R_6$ each independently represents a hydrogen atom, a halogen atom, a hydroxyl group, a C1–C12 alkyl group, a C1–C12 alkenyl group, a C1–C12 alkoxy group, a C1–C12 alkoxycarbonyl group, or an arylalkyl group, wherein the alkyl group, the alkoxy group, the alkoxycarbonyl group, and the arylalkyl group may be substituted by a hydroxyl group, a halogen atom, a C1–C12 alkyl group, a C1–C12 alkoxy group, a sulfonic acid group, a glycidyloxy group, a cyano group, an isocyanate group, or a (meth)acryloyl group, or, the alkyl group, the alkoxy group, the alkoxycarbonyl group, and the arylalkyl group may contain, as an insertion, an oxygen atom, a sulfur atom, a carbonyl group, an ester group, an amido group, or an imino group; and the substitution and the insertion may occur in combination, and $R_3$ represents a hydrogen atom in the case of $R_3$ being in the 5-position.

2. The polymeric material composition according to claim 1, wherein the polymeric material contains a hetero atom.

3. The polymeric material composition according to claim 2, wherein the polymeric material contains a hetero atom in its backbone chain.

4. The polymeric material composition according to claim 3, wherein the polymeric material is a polycarbonate resin.

5. The polymeric material composition according to claim 2, wherein the polymeric material is a poly(meth)acrylate resin.

* * * * *